(12) United States Patent  
Murakami et al.

(10) Patent No.: US 10,704,679 B2  
(45) Date of Patent: Jul. 7, 2020

(54) HYDRAULIC CONTROL DEVICE

(71) Applicants: Subaru Corporation, Tokyo (JP); Nidec Tosok Corporation, Zama-shi, Kanagawa (JP)

(72) Inventors: Mamoru Murakami, Tokyo (JP); Hiroaki Kosugi, Tokyo (JP); Kunio Kimpara, Zama (JP)

(73) Assignees: SUBARU CORPORATION, Tokyo (JP); NIDEC TOSOK CORPORATION, Kanagawa (JP)

( * ) Notice: Subject to any disclaimer, the term of this patent is extended or adjusted under 35 U.S.C. 154(b) by 197 days.

(21) Appl. No.: 15/927,119

(22) Filed: Mar. 21, 2018

(65) Prior Publication Data

US 2018/0274670 A1    Sep. 27, 2018

(30) Foreign Application Priority Data

Mar. 24, 2017   (JP) .................................. 2017-059728

(51) Int. Cl.
| | |
|---|---|
| *F16N 25/02* | (2006.01) |
| *F16H 57/04* | (2010.01) |
| *F16H 61/02* | (2006.01) |
| *F16H 61/00* | (2006.01) |
| *F15B 11/024* | (2006.01) |

(52) U.S. Cl.
CPC ........ *F16H 61/0276* (2013.01); *F15B 11/024* (2013.01); *F16H 57/0435* (2013.01); (Continued)

(58) Field of Classification Search
CPC ................ F15B 11/024; F15B 2211/45; F15B 2211/455; F15B 2211/46; F16H 57/04; F16H 61/0025; F16H 61/0206; F16H 61/0276; F16H 61/4017; F16H 61/4026; F16H 61/4043; F16H 61/4061; F16H 2061/0037; F16H 57/0435; F16N 25/02; (Continued)

(56) References Cited

U.S. PATENT DOCUMENTS 2,728,194 A * 12/1955 Clark ..................... B23Q 5/266  
    60/430  
4,712,375 A * 12/1987 Kauss ..................... B62D 5/07  
    60/405

(Continued)

FOREIGN PATENT DOCUMENTS

| JP | 2015-057559 A | 3/2015 |
|---|---|---|
| JP | 2016-183579 A | 10/2016 |

*Primary Examiner* — Robert K Arundale  
*Assistant Examiner* — Richard K. Durden  
(74) *Attorney, Agent, or Firm* — Keating & Bennett

(57) ABSTRACT

In a hydraulic control device, a first valve device is brought into an open state when a first value obtained by subtracting a value of a pressure in the first output side oil passage from a value of a pressure in the second output side oil passage is equal to or larger than a first threshold value. A second valve device is brought into an open state when an oil pressure in a third connection oil passage is equal to or larger than a second threshold value, and is brought into a closed state when the oil pressure in the third connection oil passage is smaller than the second threshold value. The first value is equal to or larger than the first threshold value and the first valve device is in the open state when the second valve device is in the closed state.

8 Claims, 4 Drawing Sheets

(52) U.S. Cl.
CPC ......... F16H 61/0025 (2013.01); F16N 25/02 (2013.01); *F16H 61/0206* (2013.01); *F16H 2061/0037* (2013.01); *F16H 2061/0279* (2013.01); *F16H 2700/00* (2013.01); *F16N 2210/04* (2013.01); *F16N 2280/00* (2013.01)

(58) Field of Classification Search
CPC ....... Y10T 137/86002; Y10T 137/8601; Y10T 137/86059; Y10T 137/86147; Y10T 137/86155
USPC ............ 137/565.13, 565.14, 565.19, 565.31, 137/565.32
See application file for complete search history.

(56) References Cited

U.S. PATENT DOCUMENTS

| | | | |
|---|---|---|---|
| 8,038,416 B2* | 10/2011 | Ono | F04C 14/26 137/565.15 |
| 2012/0141302 A1* | 6/2012 | Hwang | F16H 61/0025 417/253 |
| 2013/0134004 A1* | 5/2013 | Hwang | F16H 61/00 192/3.33 |
| 2014/0290767 A1* | 10/2014 | Jo | F16H 61/0206 137/565.11 |
| 2015/0030472 A1* | 1/2015 | Wi | F16H 61/0025 417/286 |
| 2015/0068340 A1* | 3/2015 | Wi | F16H 61/0025 74/473.11 |
| 2015/0075151 A1* | 3/2015 | Wi | F16H 61/0025 60/464 |
| 2015/0075154 A1* | 3/2015 | Wi | F16H 61/0025 60/464 |
| 2015/0167833 A1* | 6/2015 | Jo | F16H 61/0025 137/565.14 |
| 2017/0009877 A1* | 1/2017 | Ichimura | F16H 61/0206 |
| 2017/0059032 A1* | 3/2017 | Son | F16H 57/0446 |

\* cited by examiner

HYDRAULIC CONTROL DEVICE

CROSS-REFERENCE TO RELATED APPLICATION

Priority is claimed on Japanese Patent Application No. 2017-059728, filed on Mar. 24, 2017, the contents of which are incorporated herein by reference.

BACKGROUND OF THE INVENTION

Field of the Invention

The present invention relates to a hydraulic control device.

Description of Related Art

Oil pressure supply systems in which an all discharge mode and a half discharge mode are switched between are known. Patent Document 1 describes a constitution in which an all discharge mode and a half discharge mode can be switched between using a solenoid valve.
[Patent Document]
[Patent Document 1] Japanese Unexamined Patent Application, First Publication No. 2015-057559

However, since the above-described solenoid valve has a relatively high cost, there is a problem that manufacturing costs of the oil pressure supply system are increased when a solenoid valve in which an all discharge mode and a half discharge mode are switched between is used. Furthermore, there is a problem that a solenoid valve has a larger restriction on an arrangement thereof than a spool valve or the like operating with a differential pressure and a size of the oil pressure supply system is likely to be large.

The present invention was made in view of the above circumstances and an object of the present invention is to provide a hydraulic control device in which an all discharge state and a half discharge state can be switched between, which has a small size and for which the manufacturing costs are low.

SUMMARY OF THE INVENTION

One aspect of a hydraulic control device according to the present invention is a hydraulic control device which is configured to control an object to be controlled by an oil pressure. The hydraulic control device includes: an oil pump having a first discharge port and a second discharge port; an input side oil passage through which oil suctioned from an oil tank to the oil pump passes; a first output side oil passage into which the oil discharged through the first discharge port flows and which supplies an oil pressure to the object to be controlled; a second output side oil passage into which the oil discharged through the second discharge port flows; a first connection oil passage through which the first output side oil passage and the second output side oil passage are connected; a second connection oil passage through which the second output side oil passage and the input side oil passage are connected; a first valve device provided in the first connection oil passage; a second valve device provided in the second connection oil passage; and a third connection oil passage through which the second valve device are connected to a portion of the first output side oil passage on the object to be controlled side rather than a portion thereof to which the first connection oil passage is connected, wherein the first valve device is brought into an open state in which oil in the first connection oil passage is allowed to flow from the second output side oil passage to the first output side oil passage when a first value obtained by subtracting a value of a first output oil pressure in a portion in the first output side oil passage to which the first connection oil passage is connected from a value of a second output oil pressure in a portion in the second output side oil passage to which the first connection oil passage is connected is equal to or larger than a first threshold value greater than 0, and is brought into a closed state in which a flow of the oil in the first connection oil passage between the second output side oil passage and the first output side oil passage is cut off when the first value is smaller than the first threshold value, the second valve device is brought into an open state in which the oil in the second connection oil passage is allowed to flow from the second output side oil passage to the input side oil passage when an oil pressure in the third connection oil passage is equal to or larger than a second threshold value, and is brought into a closed state in which a flow of the oil in the second connection oil passage between the second output side oil passage and the input side oil passage is cut off when the oil pressure in the third connection oil passage is smaller than the second threshold value, and the first value is equal to or larger than the first threshold value and the first valve device is in the open state when the second valve device is in the closed state.

According to one aspect of the present invention, a hydraulic control device in which an all discharge state and a half discharge state can be switched between, which has a small size and can have reduced manufacturing costs can be provided.

DETAILED DESCRIPTION OF THE INVENTION

Figure 1:
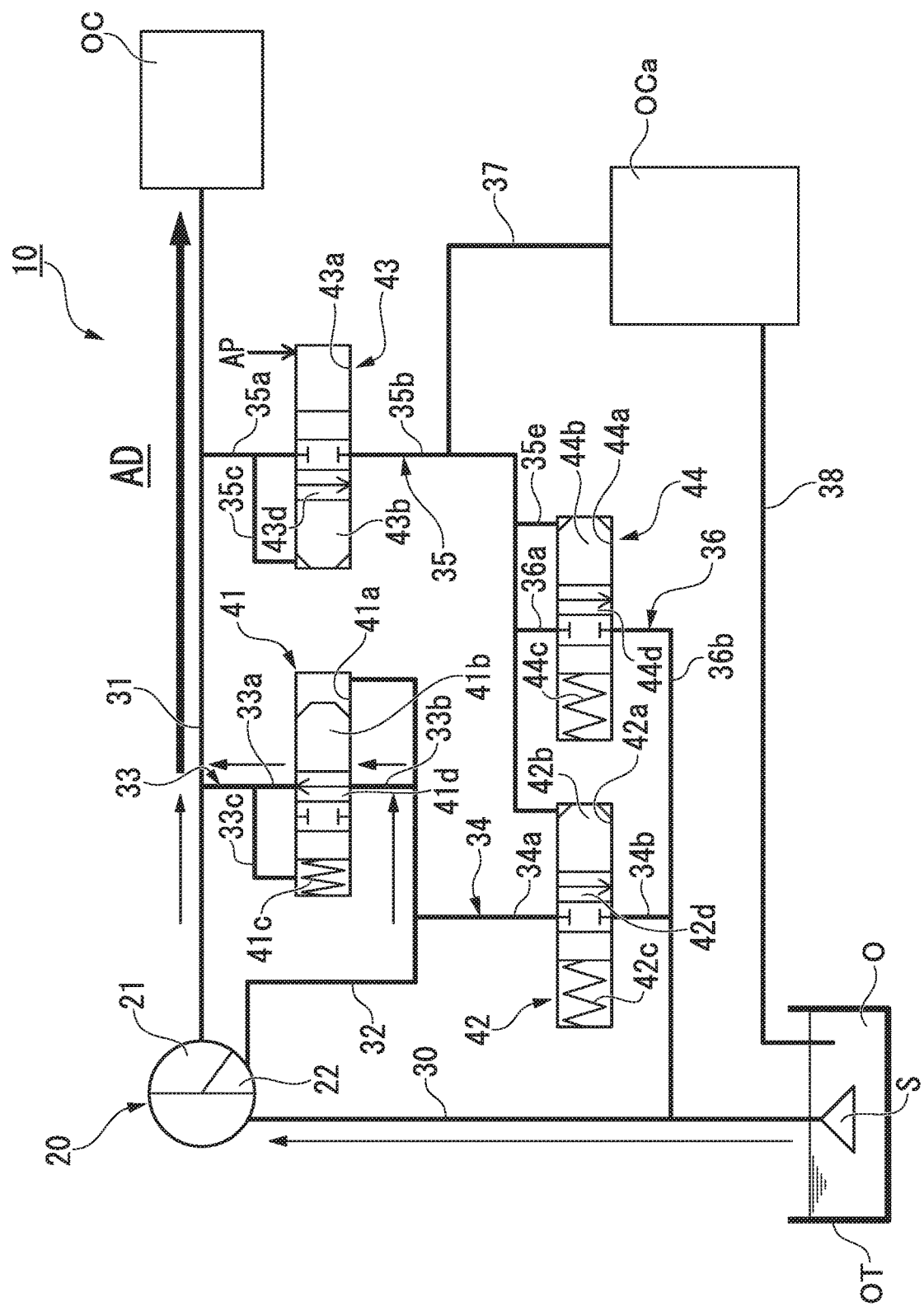
FIG. 1 is a diagram schematically showing a hydraulic control device according to an embodiment.
Figure 2:
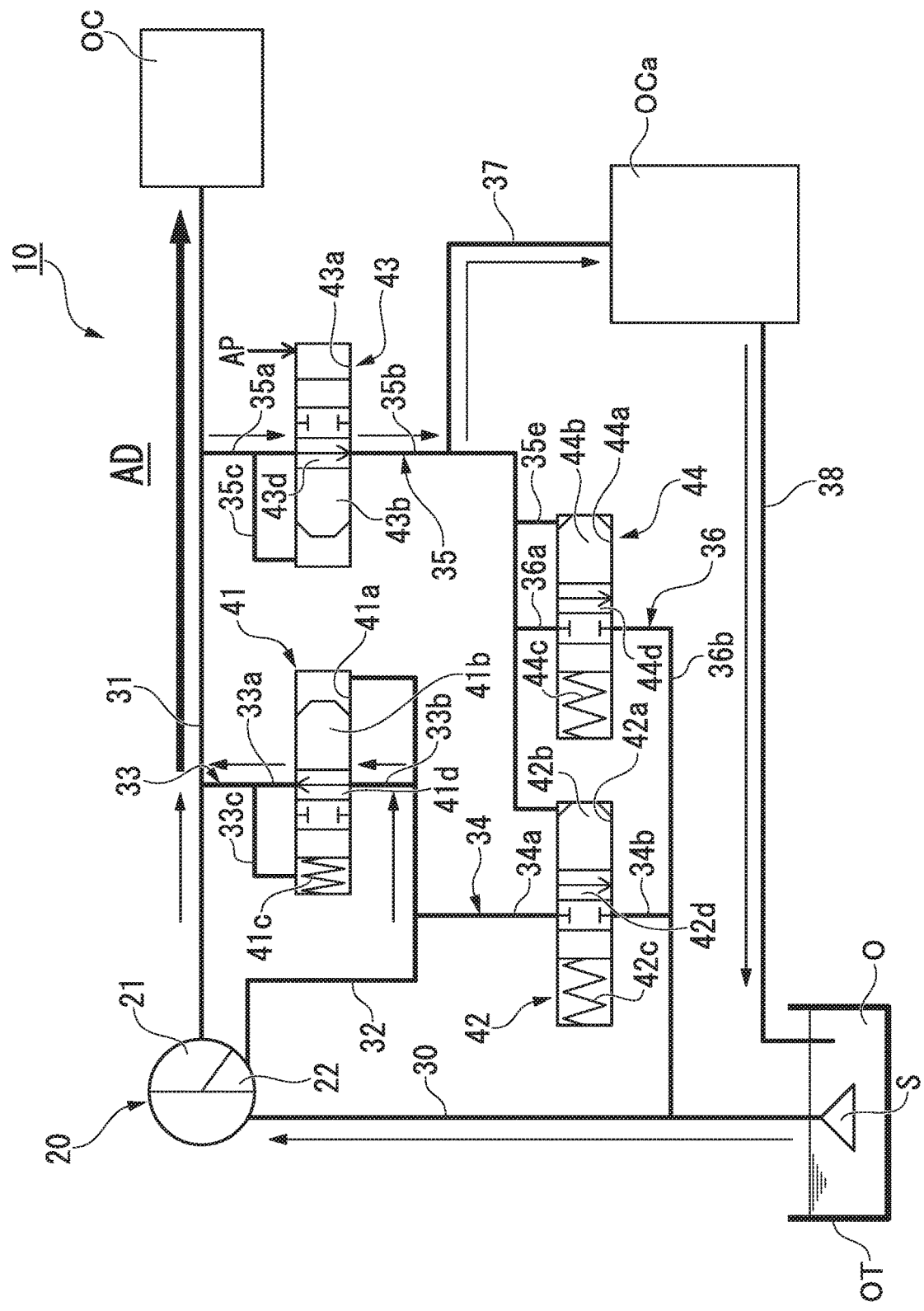
FIG. 2 is a diagram schematically showing a hydraulic control device according to an embodiment.
Figure 3:
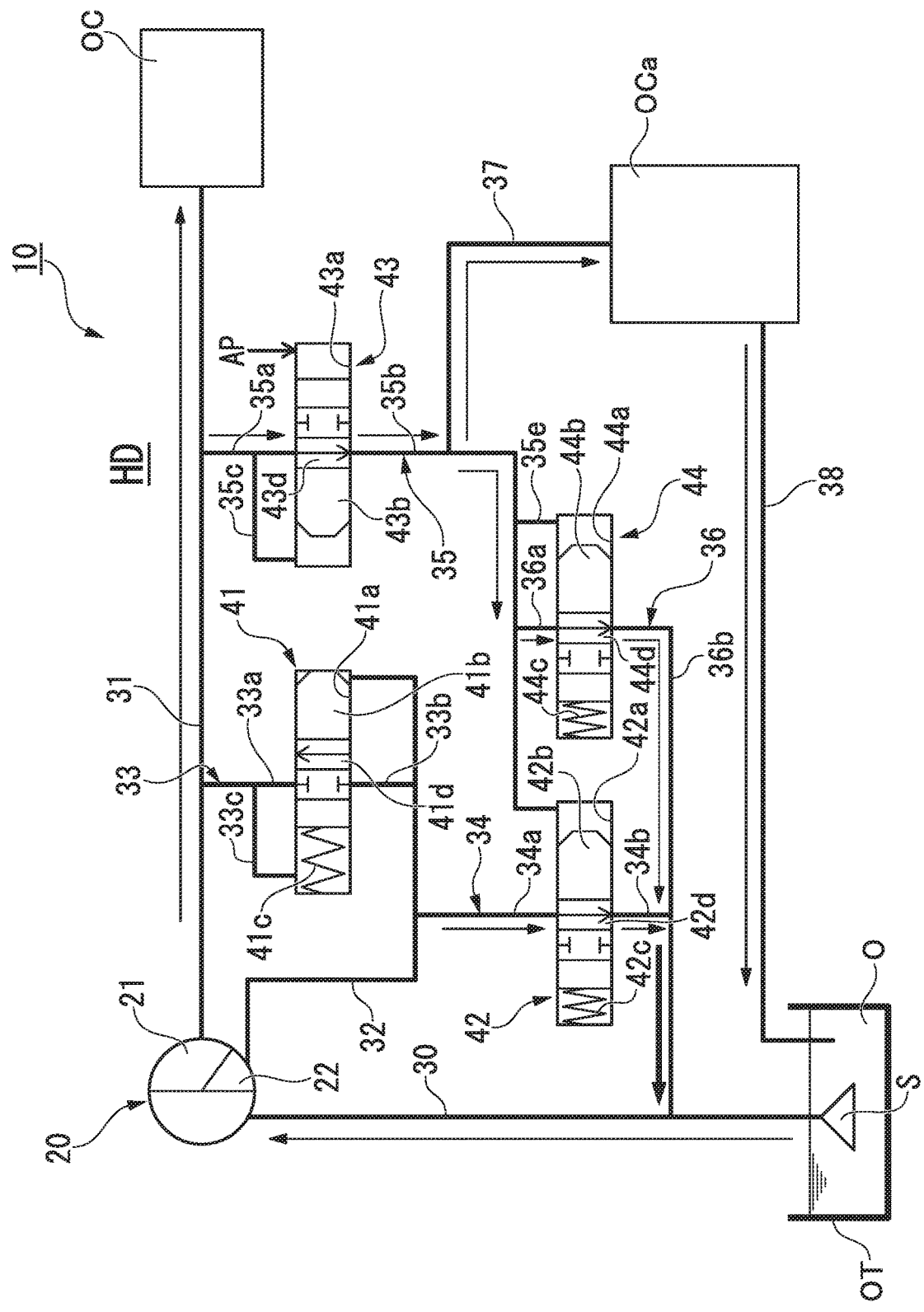
FIG. 3 is a diagram schematically showing a hydraulic control device according to an embodiment.

A hydraulic control device 10 in an embodiment shown in FIGS. 1 to 3 controls an object to be controlled OC by an oil pressure. The hydraulic control device 10 is mounted in, for example, a vehicle. The object to be controlled OC is, for example, an automatic transmission or the like of the vehicle. The hydraulic control device 10 includes an oil pump 20, an input side oil passage 30, a first output side oil passage 31, a second output side oil passage 32, a first connection oil passage 33, a second connection oil passage 34, a third connection oil passage 35, a fourth connection oil passage 36, a supply oil passage 37, a discharge oil passage 38, a first valve device 41, a second valve device 42, a third valve device 43, and a fourth valve device 44.

The oil pump 20 is, for example, a pump configured to be driven by an engine of the vehicle and transfer oil O. The oil pump 20 includes a first discharge port 21 and a second discharge port 22. The oil pump 20 is driven to discharge the oil O through the first discharge port 21 and the second discharge port 22. In the embodiment, an oil pressure of the oil O discharged through the second discharge port 22 is larger than an oil pressure of the oil O discharged through the first discharge port 21.

The input side oil passage 30 is an oil passage through which the oil O suctioned from an oil tank OT in which the oil O is stored into the oil pump 20 passes. A strainer S disposed in the oil O stored in the oil tank OT is connected to an end of the input side oil passage 30 on the oil tank OT side.

The first output side oil passage 31 is an oil passage into which the oil O discharged through the first discharge port 21 flows. The first output side oil passage 31 connects the first discharge port 21 and the object to be controlled OC. The first output side oil passage 31 provides an oil pressure of the oil O to the object to be controlled OC. The second output side oil passage 32 is an oil passage into which the oil O discharged through the second discharge port 22 flows.

The first connection oil passage 33 is an oil passage through which the first output side oil passage 31 and the second output side oil passage 32 are connected. The second connection oil passage 34 is an oil passage through which the second output side oil passage 32 and the input side oil passage 30 are connected. The third connection oil passage 35 is an oil passage which connects the first output side oil passage 31 on the object to be controlled OC side of a portion to which the first connection oil passage 33 is connected, that is, a right part in the drawing, to the second valve device 42.

The fourth connection oil passage 36 is an oil passage through which the third connection oil passage 35 and the input side oil passage 30 are connected. In the embodiment, the fourth connection oil passage 36 is joined to the second connection oil passage 34 at a portion on the input side oil passage 30 side and is connected to the input side oil passage 30. Each of the second connection oil passage 34 and the fourth connection oil passage 36 may be connected to the input side oil passage 30.

The supply oil passage 37 is an oil passage connected to the third connection oil passage 35. The supply oil passage 37 extends from the third connection oil passage 35 to a portion OCa of the object to be controlled OC and the oil O is supplied to the portion OCa of the object to be controlled OC through the supply oil passage 37 as lubricating oil. The portion OCa is, for example, a gear or the like of the automatic transmission of the vehicle. Thus, lubricity of the portion OCa may be improved using some of the oil O discharged from the oil pump 20.

The discharge oil passage 38 is an oil passage configured to return the oil O supplied to the portion OCa to the oil tank OT. For example, when the oil tank OT is disposed below the portion OCa or the like, the oil O supplied to the portion OCa may drop and return directly to the oil tank OT without the discharge oil passage 38 being provided.

The first valve device 41 is provided in the first connection oil passage 33. The first valve device 41 is provided so that the first connection oil passage 33 is divided into a first portion 33a and a second portion 33b. The first portion 33a is an oil passage through which the first output side oil passage 31 and the first valve device 41 are connected. The second portion 33b is an oil passage through which the second output side oil passage 32 and the first valve device 41 are connected. The first valve device 41 includes a first spool hole 41a, a first spool valve 41b, and a first elastic member 41c.

The first spool hole 41a extends in a left/right direction in FIGS. 1 to 3. In other words, in the embodiment, the left/right direction in each drawing corresponds to a first direction along which the first spool hole 41a extends. A cross-sectional shape of the first spool hole 41a is, for example, a circular shape. Note that, in the following description, the left/right direction of FIGS. 1 to 3 is simply referred to as a "left/right direction." Furthermore, a left side of FIGS. 1 to 3 in the left/right direction is simply referred to as a "left side" and a right side of FIGS. 1 to 3 in the left/right direction is simply referred to as a "right side." The left side corresponds to one side in the first direction and the right side corresponds to the other side in the first direction. It should be note that the left/right direction, the left side, and the right side are names for simply explaining a relative positional relationship between the parts and an actual arrangement relationship or the like may be an arrangement relationship or the like other than an arrangement relationship or the like represented by these names The first spool valve 41b has a cylindrical shape extending in the left/right direction. The first spool valve 41b is disposed inside the first spool hole 41a to be movable in the left/right direction. The first spool valve 41b has a first connection oil passage 41d. The first portion 33a and the second portion 33b can be connected to each other through the first connection oil passage 41d. As shown in FIG. 1, when the first portion 33a and the second portion 33b are connected to each other through the first connection oil passage 41d, the oil O flowing from the second output side oil passage 32 to the first output side oil passage 31 passes through the first connection oil passage 41d. The first elastic member 41c is disposed at a portion inside the first spool hole 41a positioned on the left side of the first spool valve 41b. The first elastic member 41c pushes the first spool valve 41b from the left side to the right side.

The hydraulic control device 10 further includes a first branch oil passage 33c through which a portion of the first connection oil passage 33 through which the first output side oil passage 31 and the first valve device 41 are connected, that is, the first portion 33a, and a portion inside the first spool hole 41a positioned on the left side of the first spool valve 41b are connected. The oil O from the first output side oil passage 31 flows into the portion inside the first spool hole 41a positioned on the left side of the first spool valve 41b via the first branch oil passage 33c. Thus, the overall length of the oil passage configured to guide the oil O in the first output side oil passage 31 to the portion inside the first spool hole 41a on the left side of the first spool valve 41b can easily be kept constant irrespective of a position at which the first valve device 41 is disposed.

An end of the second output side oil passage 32 on a side opposite to the second discharge port 22 side is connected to a portion inside the first spool hole 41a positioned on the right side of the first spool valve 41b. Thus, the oil O from the second output side oil passage 32 flows into the portion inside the first spool hole 41a positioned on the right side of the first spool valve 41b.

Thus, the first spool valve 41b is moved in the left/right direction in accordance with an equilibrium between a force obtained by adding a rightward force applied by a first output oil pressure P1 of the oil O in the first output side oil passage 31 flowing from the first branch oil passage 33c into the first spool hole 41a and a rightward force of the first elastic member 41c and a leftward force applied by a second output oil pressure P2 of the oil O in the second output side oil passage 32 flowing from the second output side oil passage 32 into the first spool hole 41a.

The first output oil pressure P1 corresponds to an oil pressure in a portion in the first output side oil passage 31 to which the first connection oil passage 33 is connected. The second output oil pressure P2 corresponds to an oil pressure in a portion in the second output side oil passage 32 to which the first connection oil passage 33 is connected. The first spool valve 41b is moved in the left/right direction so that the first connection oil passage 41d is moved in the left/right direction and a state of the first valve device 41 is changed between a state in which the first portion 33a and the second portion 33b are connected and a state in which the first portion 33a and the second portion 33b are disconnected.

In the first valve device 41, the state in which the first portion 33a and the second portion 33b are connected is an open state in which the oil O in the first connection oil passage 33 is allowed to flow from the second output side oil passage 32 to the first output side oil passage 31. In the first valve device 41, the state in which the first portion 33a and the second portion 33b are disconnected is a closed state in which a flow of the oil O in the first connection oil passage 33 between the second output side oil passage 32 and the first output side oil passage 31 is cut off. In other words, the state of the first valve device 41 is changed between the open state and the closed state along with movement of the first spool valve 41b in the left/right direction. FIGS. 1 and 2 show a case in which the first valve device 41 is in the open state and FIG. 3 shows a case in which the first valve device 41 is in the closed state.

To be specific, for example, when the second output oil pressure P2 decreases in the open state shown in FIG. 1, a leftward force applied to the first spool valve 41b becomes smaller than a rightward force applied to the first spool valve 41b and thus the first spool valve 41b is moved rightward. Since the elastic force of the first elastic member 41c decreases when the first spool valve 41b is moved rightward, a rightward force applied to the first spool valve 41b decreases. The first spool valve 41b is moved rightward to a position at which a rightward force decreasing along with movement thereof to the right side and a leftward force of the decreased second output oil pressure P2 have an equilibrium state.

When the first spool valve 41b is moved rightward from the open state shown in FIG. 1, the first connection oil passage 41d is displaced and thus the first connection oil passage 33 is gradually cut off. Moreover, in the first valve device 41, the first connection oil passage 33 is fully cut off when a first value obtained by subtracting a value of the first output oil pressure P1 from a value of the second output oil pressure P2 is smaller than a first threshold value and is thus brought into the closed state shown in FIG. 3.

On the other hand, when the second output oil pressure P2 increases in a closed state, the first spool valve 41b is moved leftward unlike the above case. Moreover, the first valve device 41 is brought into an open state when the first value is equal to or larger than the first threshold value. The first threshold value is greater than 0. In other words, when the first valve device 41 is in the open state, the second output oil pressure P2 is larger than the first output oil pressure P1. Thus, the first valve device 41 is brought into an open state so that the oil O flows from the second output side oil passage 32 to the first output side oil passage 31 via the first connection oil passage 33. The first threshold value is equal to or less than a value of a rightward elastic force on the first spool valve 41b applied by the first elastic member 41c when the first valve device 41 is in an open state.

The second valve device 42 is provided in the second connection oil passage 34. The second valve device 42 is provided so that the second connection oil passage 34 is divided into a first portion 34a and a second portion 34b. The first portion 34a is an oil passage through which the second output side oil passage 32 and the second valve device 42 are connected. The second portion 34b is an oil passage through which the input side oil passage 30 and the second valve device 42 are connected. The second valve device 42 has a second spool hole 42a, a second spool valve 42b, and a second elastic member 42c.

The second spool hole 42a extends in the left/right direction. In other words, the left/right direction in each drawing in the embodiment corresponds to a second direction in which the second spool hole 42a extends. In the embodiment, the first direction and the second direction are parallel to each other. Furthermore, the left side corresponds to one side in the second direction and the right side corresponds to the other side in the second direction.

The second spool valve 42b has a cylindrical shape extending in the left/right direction. The second spool valve 42b is disposed inside the second spool hole 42a to be movable in the left/right direction. The second spool valve 42b has a second connection oil passage 42d. The first portion 34a and the second portion 34b can be connected to each other through the second connection oil passage 42d. As shown in FIG. 3, when the first portion 34a and the second portion 34b are connected to each other through the second connection oil passage 42d, the oil O flowing from the second output side oil passage 32 to the input side oil passage 30 passes through the second connection oil passage 42d. The second elastic member 42c is disposed in a portion inside the second spool hole 42a positioned on the left side of the second spool valve 42b. The second elastic member 42c pushes the second spool valve 42b from the left side to the right side.

An end of the third connection oil passage 35 on a side opposite to the first output side oil passage 31 side is connected to a portion inside the second spool hole 42a positioned on the right side of the second spool valve 42b. Thus, the oil O from the third connection oil passage 35 flows into the portion inside the second spool hole 42a positioned on the right side of the second spool valve 42b.

Therefore, the second spool valve 42b is moved in the left/right direction in accordance with an equilibrium between a rightward force of the second elastic member 42c and a leftward force applied by an oil pressure of the oil O flowing from the third connection oil passage 35 into the second spool hole 42a. The second spool valve 42b is moved in the left/right direction so that the second connection oil passage 42d is moved in the left/right direction and a state of the second valve device 42 is changed between a state in which the first portion 34a and the second portion 34b are connected and a state in which the first portion 34a and the second portion 34b are disconnected.

In the second valve device 42, the state in which the first portion 34a and the second portion 34b are connected is an open state in which the oil O in the second connection oil passage 34 is allowed to flow from the second output side oil passage 32 to the input side oil passage 30. In the second valve device 42, the state in which the first portion 34a and the second portion 34b are disconnected is a closed state in which a flow of the oil O in the second connection oil passage 34 between the second output side oil passage 32 and the input side oil passage 30 is cut off. In other words, the state of the second valve device 42 is changed between the open state and the closed state along with movement of the second spool valve 42b in the left/right direction. FIGS. 1 and 2 show a case in which the second valve device 42 is in the closed state and FIG. 3 shows a case in which the second valve device 42 is in the open state.

The second valve device 42 is brought into the open state when an oil pressure in the third connection oil passage 35 is equal to or larger than a second threshold value. The second valve device 42 is brought into the closed state when the oil pressure in the third connection oil passage 35 is smaller than the second threshold value. The second threshold value is greater than 0. The second threshold value is equal to or less than a value of a rightward elastic force applied to the second spool valve 42b by the second elastic member 42c when the second valve device 42 is in the open state. In other words, the second threshold value is the same as the value of an elastic force of the second elastic member 42c immediately after the second valve device 42 is switched from the closed state to the open state.

The third valve device 43 is provided in the third connection oil passage 35. The third valve device 43 is provided so that the third connection oil passage 35 is divided into a first portion 35a and a second portion 35b. The first portion 35a is an oil passage through which the first output side oil passage 31 and the third valve device 43 are connected. The second portion 35b is an oil passage through which the third valve device 43 and the second valve device 42 are connected. The supply oil passage 37 is connected to the second portion 35b. The third valve device 43 has a third spool hole 43a and a third spool valve 43b.

The third spool hole 43a extends in the left/right direction. The third spool valve 43b has a cylindrical shape extending in the left/right direction. The third spool valve 43b is disposed inside the third spool hole 43a to be movable in the left/right direction. The third spool valve 43b includes a third connection oil passage 43d. The first portion 35a and the second portion 35b can be connected through the third connection oil passage 43d. As shown in FIG. 2, when the first portion 35a and the second portion 35b are connected to each other through the third connection oil passage 43d, the oil O flowing from the first output side oil passage 31 to the second valve device 42, the oil O flowing from the first output side oil passage 31 to the fourth valve device 44, and the oil O flowing from the first output side oil passage 31 to the supply oil passage 37 pass through the third connection oil passage 43d.

The hydraulic control device 10 further includes a second branch oil passage 35c through which a portion of the third connection oil passage 35 through which the first output side oil passage 31 and the third valve device 43 are connected, that is, the first portion 35a, and a portion inside the third spool hole 43a positioned on the left side of the third spool valve 43b are connected. The oil O from the first output side oil passage 31 flows into the portion inside the third spool hole 43a positioned on the left side of the third spool valve 43b via the second branch oil passage 35c. The oil O from an oil pressure source AP flows into the portion inside the third spool hole 43a positioned on the right side of the third spool valve 43b.

Thus, the third spool valve 43b is moved in the left/right direction in accordance with an equilibrium between a rightward force applied by an oil pressure of the oil O in the first output side oil passage 31 flowing from the second branch oil passage 35c into the third spool hole 43a and a leftward force applied by an oil pressure of the oil O flowing from the oil pressure source AP into the third spool hole 43a. The third spool valve 43b is moved in the left/right direction so that the third connection oil passage 43d is moved in the left/right direction and a state of the third valve device 43 is changed between a state in which the first portion 35a and the second portion 35b are connected and a state in which the first portion 35a and the second portion 35b are disconnected.

In the third valve device 43, the state in which the first portion 35a and the second portion 35b are connected is an open state in which the oil O in the third connection oil passage 35 is allowed to flow from the first output side oil passage 31 to the second valve device 42. In the third valve device 43, the state in which the first portion 35a and the second portion 35b are disconnected is a closed state in which a flow of the oil O in the third connection oil passage 35 between the first output side oil passage 31 and the second valve device 42 is cut off. In other words, the state of the third valve device 43 is changed between the open state and the closed state along with movement of the third spool valve 43b in the left/right direction. FIG. 1 shows a case in which the third valve device 43 is in the closed state and FIGS. 2 and 3 show a case in which the third valve device 43 is in the open state.

The third valve device 43 is brought into the open state when a third output oil pressure P3 in a portion in the first output side oil passage 31 to which the third connection oil passage 35 is connected is equal to or larger than a third threshold value. The third valve device 43 is brought into the closed state when the third output oil pressure P3 is smaller than the third threshold value. The third threshold value is greater than 0. The third threshold value changes in accordance with an oil pressure of the oil O supplied from the oil pressure source AP.

When the third valve device 43 is brought into the open state, some of the oil O in the first output side oil passage 31 is discharged into the third connection oil passage 35 and thus the third output oil pressure P3 decreases. For this reason, when the third output oil pressure P3, that is, an oil pressure in the first output side oil passage 31, is equal to or larger than a target value, the oil pressure in the first output side oil passage 31 can be adjusted and decreased. Thus, an oil pressure applied to the object to be controlled OC by the first output side oil passage 31 is able to be easily adjusted constantly. Furthermore, since the third threshold value can be adjusted by adjusting the oil O supplied from the oil pressure source AP, an oil pressure applied from the first output side oil passage 31 to the object to be controlled OC can be easily changed.

The fourth valve device 44 is provided in the fourth connection oil passage 36. The fourth valve device 44 is provided so that the fourth connection oil passage 36 is divided into a first portion 36a and a second portion 36b. The first portion 36a is an oil passage through which a portion of the third connection oil passage 35 on the second valve device 42 side of the second portion 35b to which the supply oil passage 37 is connected is connected to the fourth valve device 44. The second portion 36b is an oil passage through which the fourth valve device 44 and the input side oil passage 30 are connected. The second portion 36b is joined to a portion of the second portion 34b in the second connection oil passage 34 on the input side oil passage 30 side and is connected to the input side oil passage 30. The fourth valve device 44 has a fourth spool hole 44a, a fourth spool valve 44b, and a fourth elastic member 44c.

The fourth spool hole 44a extends in the left/right direction. The fourth spool valve 44b has a cylindrical shape extending in the left/right direction. The fourth spool valve 44b is disposed inside the fourth spool hole 44a to be movable in the left/right direction. The fourth spool valve 44b includes a fourth connection oil passage 44d. The first portion 36a and the second portion 36b can be connected through the fourth connection oil passage 44d. As shown in FIG. 3, when the first portion 36a and the second portion 36b are connected through the fourth connection oil passage 44d, the oil O flowing from the third connection oil passage 35 to the input side oil passage 30 passes through the fourth connection oil passage 44d. The fourth elastic member 44c is disposed at a portion inside the fourth spool hole 44a positioned on the left side of the fourth spool valve 44b. The fourth elastic member 44c pushes the fourth spool valve 44b from the left side to the right side.

The hydraulic control device 10 further includes a third branch oil passage 35e through which a portion of the third connection oil passage 35 through which the second valve device 42 and the third valve device 43 are connected, that is, the second portion 35b, and a portion inside the fourth spool hole 44a positioned on the right side of the fourth spool valve 44b are connected. The oil O from the third connection oil passage 35 flows into the portion inside the fourth spool hole 44a positioned on the right side of the fourth spool valve 44b via the third branch oil passage 35e.

Thus, the fourth spool valve 44b is moved in the left/right direction in accordance with an equilibrium between a rightward force of the fourth elastic member 44c and a leftward force applied by an oil pressure of the oil O flowing from the third branch oil passage 35e into the fourth spool hole 44a. The fourth spool valve 44b is moved in the left/right direction so that the fourth connection oil passage 44d is moved in the left/right direction and a state of the fourth valve device 44 is changed between a state in which the first portion 36a and the second portion 36b are connected and a state in which the first portion 36a and the second portion 36b are disconnected.

In the fourth valve device 44, the state in which the first portion 36a and the second portion 36b are connected is an open state in which the oil O in the fourth connection oil passage 36 is allowed to flow from the third connection oil passage 35 to the input side oil passage 30. In the fourth valve device 44, the state in which the first portion 36a and the second portion 36b are disconnected is a closed state in which a flow of the oil O in the fourth connection oil passage 36 between the third connection oil passage 35 and the input side oil passage 30 is cut off. In other words, the state of the fourth valve device 44 is changed between the open state and the closed state along with movement of the fourth spool valve 44b in the left/right direction. FIGS. 1 and 2 show a case in which the fourth valve device 44 is in the closed state and FIG. 3 shows a case in which the fourth valve device 44 is in the open state.

The fourth valve device 44 is brought into the open state when an oil pressure in the third connection oil passage 35 is equal to or larger than a fourth threshold value. The fourth valve device 44 is brought into the closed state when the oil pressure in the third connection oil passage 35 is smaller than the fourth threshold value. The fourth threshold value is greater than 0. The fourth threshold value is equal to or less than a value of a rightward elastic force applied to the fourth spool valve 44b by the fourth elastic member 44c when the fourth valve device 44 is in the open state. In the embodiment, for example, the fourth threshold value is larger than the second threshold value.

According to the hydraulic control device 10 in the embodiment, an all discharge state AD in which both of the oil O discharged through the first discharge port 21 and the oil O discharged through the second discharge port 22 are supplied to the object to be controlled OC and a half discharge state HD in which only the oil O discharged through the first discharge port 21 is supplied to the object to be controlled OC can be automatically switched between in accordance with a flow rate Q of the oil O discharged by the oil pump 20. FIGS. 1 and 2 show a case in which the hydraulic control device 10 is in the all discharge state AD and FIG. 3 shows a case in which the hydraulic control device 10 is in the half discharge state HD.

The hydraulic control device 10 is in the all discharge state AD shown in FIG. 1 until the oil flow rate Q reaches a target value at which the oil is supplied to the object to be controlled OC. In the all discharge state AD shown in FIG. 1, the first valve device 41 is in the open state, the second valve device 42 is in the closed state, the third valve device 43 is in the closed state, and the fourth valve device 44 is in the closed state. Thus, the oil O in the second output side oil passage 32 joins the first output side oil passage 31 via the first connection oil passage 33 and all of the oil O discharged from the oil pump 20 is supplied to the object to be controlled OC.

When the oil flow rate Q exceeds the target value at which the oil O is supplied to the object to be controlled OC, the third output oil pressure P3 in the first output side oil passage 31 increases to be equal to or larger than the third threshold value and the third valve device 43 is brought into the open state to keep the oil pressure in the first output side oil passage 31 constant. Thus, the hydraulic control device 10 is in the all discharge state AD shown in FIG. 2. In the all discharge state AD shown in FIG. 2, the first valve device 41 is in the open state, the second valve device 42 is in the closed state, the third valve device 43 is in the open state, and the fourth valve device 44 is in the closed state. Therefore, some of the oil O discharged from the oil pump 20 flows from the first output side oil passage 31 to the third connection oil passage 35 without being supplied to the object to be controlled OC and is supplied to the portion OCa. As shown in FIGS. 1 and 2, when the second valve device 42 is in the closed state, the first value obtained by subtracting the first output oil pressure P1 from the second output oil pressure P2 is equal to or larger than the first threshold value and thus the first valve device 41 is in the open state.

Figure 4:
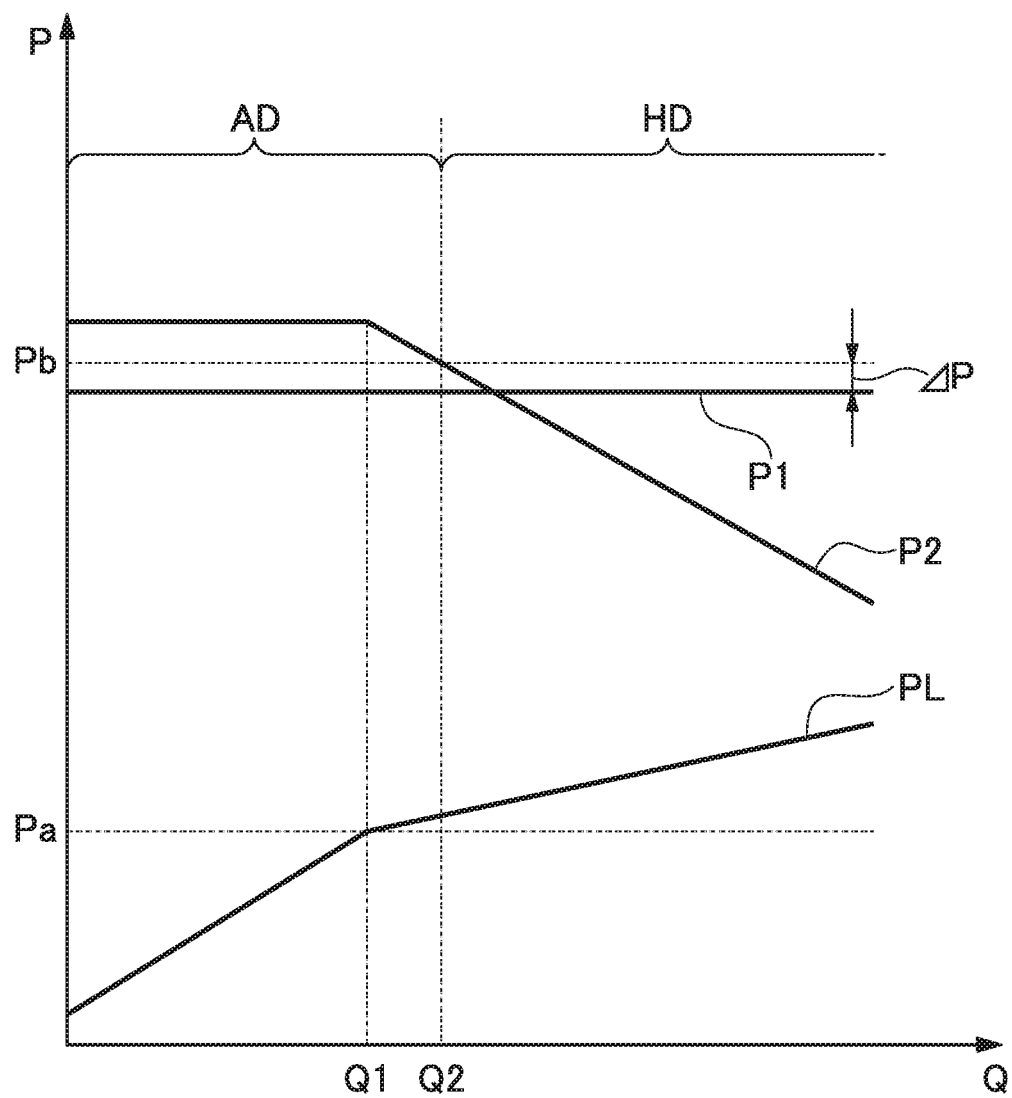
FIG. 4 is a graph showing an example of a relationship between an oil flow rate and an oil pressure of oil according to an embodiment.

After the third valve device 43 is brought into the open state, an amount of the oil O flowing from the first output side oil passage 31 to the third connection oil passage 35 increases along with an increase in the oil flow rate Q. Thus, as shown in FIG. 4, a lubrication pressure PL that is an oil pressure of the oil O in the supply oil passage 37 increases along with an increase in the oil flow rate Q. FIG. 4 shows an example in which the lubrication pressure PL linearly increases along with an increase in the oil flow rate Q. The lubrication pressure PL corresponds to an oil pressure in the third connection oil passage 35. In FIG. 4, a vertical axis represents an oil pressure P and a horizontal axis represents an oil flow rate Q. FIG. 4 shows a case in which a first output oil pressure P1 is kept constant.

In addition, as shown in FIG. 3, when the oil flow rate Q increases and the lubrication pressure PL is equal to or larger than a first oil flow rate Q1 serving as the second threshold value Pa, the second valve device 42 is brought into the open state. Thus, some of the oil O in the second output side oil passage 32 flows through the second connection oil passage 34 and joins the input side oil passage 30. For this reason, the second output oil pressure P2 of the second output side oil passage 32 decreases. A degree of opening of the second valve device 42 increases as the lubrication pressure PL increases. For this reason, after the second valve device 42 is brought into the open state, the second output oil pressure P2 decreases along with an increase in the oil flow rate Q.

FIG. 4 shows an example in which the second output oil pressure P2 linearly decreases, for example, as the oil flow rate Q increases.

Here, if the first value obtained by subtracting a value of the first output oil pressure P1 from a value of the second output oil pressure P2 is equal to or larger than the first threshold value even if the second valve device 42 is brought into the open state, the first valve device 41 remains in the open state and the all discharge state AD is maintained.

Also, when the second valve device 42 is brought into the open state, the amount of the oil O joining the first output side oil passage 31 from the second output side oil passage 32 decreases. For this reason, the degree of increase of the lubrication pressure PL with respect to an increase in the oil flow rate Q in a range in which the oil flow rate Q is equal to or larger than the first oil flow rate Q1 in which the second valve device 42 is brought into the open state becomes smaller than that in a range in which the oil flow rate Q is smaller than the first oil flow rate Q1.

When the oil flow rate Q increases and the second output oil pressure P2 becomes larger than a second oil flow rate Q2 serving as a switching pressure Pb, the second output oil pressure P2 becomes smaller than the switching pressure Pb and thus the first valve device 41 is brought into the closed state as shown in FIG. 3. The switching pressure Pb is larger than the first output oil pressure P1. A value ΔP obtained by subtracting a value of the first output oil pressure P1 from a value of the switching pressure Pb corresponds to the first threshold value. In other words, the second output oil pressure P2 smaller than the switching pressure Pb corresponds to the first value obtained by subtracting the value of the first output oil pressure P1 from the value of the second output oil pressure P2 smaller than the first threshold value.

When the first valve device 41 is brought into the closed state, all of the oil O in the second output side oil passage 32 flows through the second connection oil passage 34 and joins the input side oil passage 30. Thus, the oil O flowing through the first output side oil passage 31 is only the oil O discharged through the first discharge port 21 and the hydraulic control device 10 is brought into the half discharge state HD.

After that, when the oil flow rate Q increases and the lubrication pressure PL becomes equal to or larger than the fourth threshold value, the fourth valve device 44 is brought into the open state. Thus, the hydraulic control device 10 is brought into the state shown in FIG. 3. When the fourth valve device 44 is brought into the open state, some of the oil O in the third connection oil passage 35 flows through the fourth connection oil passage 36 and joins the input side oil passage 30.

As described above, according to the embodiment, when the oil flow rate Q of the oil pump 20 increases, an open/closed state of each valve device can be automatically switched and the hydraulic control device 10 can be switched between the all discharge state AD and the half discharge state HD.

For example, when an amount of the oil O supplied from the supply oil passage 37 to the portion OCa as the lubricating oil increases, an amount of the oil O returning to the oil tank OT through the discharge oil passage 38 increases. Since the oil O used as the lubricating oil tends to contain impurities such as minute metal pieces, the oil O suctioned from the oil tank OT to the oil pump 20 is suctioned via the strainer S. Here, when the oil is suctioned via the strainer S, an amount of work of the oil pump 20 increases compared with a case in which the oil O is suctioned without the strainer S. Therefore, when the amount of the oil O supplied from the supply oil passage 37 to the portion OCa as the lubricating oil increases, there is a problem that the amount of work of the oil pump 20 increases and thus efficiency of the oil pump 20 decreases.

On the other hand, as described above, when the oil flow rate Q of the oil pump 20 increases, the half discharge state HD in which only the oil O discharged into the first output side oil passage 31 through the first discharge port 21 flows is set so that the amount of the oil O flowing from the first output side oil passage 31 to the third connection oil passage 35 can be reduced compared with the case of the all discharge state AD. Therefore, an increase in amount of the oil O supplied from the supply oil passage 37 to the portion OCa can be minimized and a decrease in efficiency of the oil pump 20 can be minimized In the half discharge state HD, the oil O joining the input side oil passage 30 from the second output side oil passage 32 or the third connection oil passage 35 is suctioned to the oil pump 20 without the strainer S. For this reason, an amount of work of the oil pump 20 when the oil O joining the input side oil passage 30 from the second output side oil passage 32 or the third connection oil passage 35 is suctioned is smaller than that of a case in which the oil O is suctioned via the strainer S.

According to the embodiment, as described above, the all discharge state AD and the half discharge state HD can be switched between. Since an oil pressure in the third connection oil passage 35 connected to the first output side oil passage 31 is relatively lower when the oil flow rate Q of the oil pump 20 is relatively smaller, the second valve device 42 is in the closed state. In addition, when the second valve device 42 is in the closed state, the first valve device 41 is in the open state. For this reason, the oil O flows from the second output side oil passage 32 to the first output side oil passage 31 and the hydraulic control device 10 is brought into the all discharge state AD in which all of the oil O from the first discharge port 21 and the second discharge port 22 flows to the first output side oil passage 31.

On the other hand, when the oil flow rate Q of the oil pump 20 becomes relatively larger and an oil pressure in the third connection oil passage 35 connected to the first output side oil passage 31 becomes equal to or larger than the second threshold value Pa, the second valve device 42 is brought into the open state and thus the oil O flows from the second output side oil passage 32 to the input side oil passage 30. For this reason, the second output oil pressure P2 in the second output side oil passage 32 decreases. Moreover, when the first value obtained by subtracting the first output oil pressure P1 from the second output oil pressure P2 becomes smaller than the first threshold value, the first valve device 41 is brought into the closed state. Thus, the hydraulic control device 10 is brought into the half discharge state HD in which only the oil O discharged through the first discharge port 21 flows to the first output side oil passage 31.

According to the embodiment, as described above, the all discharge state AD and the half discharge state HD can be automatically switched between along with a change in the oil flow rate Q of the oil pump 20 without using a solenoid valve. Therefore, the hydraulic control device 10 in which the all discharge state AD and the half discharge state HD are able to be switched between, which has a small size and which can be manufactured more cheaply can be obtained.

According to the embodiment, since the first valve device 41 includes the first elastic member 41c, a position of the first spool valve 41b in the left/right direction is determined in accordance with a magnitude of the second output oil pressure P2. For this reason, the degree of opening of the first valve device 41 can be changed in accordance with the magnitude of the second output oil pressure P2 and the first valve device 41 can be gradually closed along with a decrease in the second output oil pressure P2. Thus, when the all discharge state AD and the half discharge state HD are switched between, a sudden change in oil flow rate of the oil O in the first output side oil passage 31 can be minimized and a sudden change in oil pressure in the first output side oil passage 31 can be minimized Therefore, the oil pressure supplied to the object to be controlled OC can be stabilized even if the all discharge state AD and the half discharge state HD are switched between.

According to the embodiment, since some of the oil O in the third connection oil passage 35 can join the input side oil passage 30 due to the fourth valve device 44, an increase in amount of the oil O supplied from the supply oil passage 37 to the portion OCa can be further minimized According to the embodiment, since an oil pressure of the oil O discharged through the second discharge port 22 is larger than an oil pressure of the oil O discharged through the first discharge port 21, it is easy to set the second output oil pressure P2 larger than the first output oil pressure P1. Therefore, the oil O can easily flow from the second output side oil passage 32 to the first output side oil passage 31 when the first valve device 41 is in the open state.

According to the embodiment, since the second valve device 42 includes the second elastic member 42c, the position of the second spool valve 42b in the left/right direction is determined in accordance with a magnitude of an oil pressure in the third connection oil passage 35. For this reason, the degree of opening of the second valve device 42 can be changed in accordance with the magnitude of the oil pressure in the third connection oil passage 35 and the second valve device 42 can be gradually opened along with an increase in the oil flow rate Q. Thus, a sudden decrease of the value of the second output oil pressure P2 can be prevented and the all discharge state AD and the half discharge state HD can be gently switched between. Therefore, the oil pressure supplied to the object to be controlled OC can be stabilized even if the all discharge state AD and the half discharge state HD are switched between. Furthermore, an elastic force applied from the second elastic member 42c to the second spool valve 42b is changed so that the second threshold value Pa can be changed. For this reason, the second elastic member 42c may be exchanged so that the oil pressure in the third connection oil passage 35 necessary for changing the second valve device 42 from the closed state to the open state can be easily changed.

The present invention is not limited to the above-described embodiments and can also adopt other constitutions. A constitution of each valve device is not particularly limited as long as the valve device operates as described above. At least one of the third valve device 43 and the fourth valve device 44 may not be provided. If the second output oil pressure P2 can be set to be larger than the first output oil pressure P1 when the first valve device 41 is in an open state, an oil pressure of the oil O discharged through the second discharge port 22 may be lower than an oil pressure of the oil O discharged through the first discharge port 21. In this case, for example, a constitution in which an oil pressure of the oil O discharged through the first discharge port 21 is decreased or a constitution in which an oil pressure of the oil O discharged through the second discharge port 22 is increased may be provided. Directions in which spool valves in valve devices extend may be different from each other. In other words, the first direction and the second direction may not be parallel to each other.

The hydraulic control device 10 in the above-described embodiments is not particularly limited in terms of applications thereof and installation thereof other than in a vehicle is possible. Furthermore, each of the aforementioned constitutions can be appropriately combined within extents that are not inconsistent with each other.

EXPLANATION OF REFERENCES

10 Hydraulic control device
20 Oil pump
21 First discharge port
22 Second discharge port
30 Input side oil passage
31 First output side oil passage
32 Second output side oil passage
33 First connection oil passage
33c First branch oil passage
34 Second connection oil passage
35 Third connection oil passage
36 Fourth connection oil passage
37 Supply oil passage
41 First valve device
41a First spool hole
41b First spool valve
41c First elastic member
41d First connection oil passage
42 Second valve device
42a Second spool hole
42b Second spool valve
42c Second elastic member
42d Second connection oil passage
43 Third valve device
44 Fourth valve device
O Oil
OC Object to be controlled
OCa Portion (portion of object to be controlled)
OT Oil tank
P1 First output oil pressure
P2 Second output oil pressure
P3 Third output oil pressure
Pa Second threshold value
ΔP Value (first threshold value)

What is claimed is:

1. A hydraulic control device which is configured to control an object to be controlled by an oil pressure, the hydraulic control device comprising:
   an oil pump having a first discharge port and a second discharge port;
   an input side oil passage through which oil suctioned from an oil tank to the oil pump passes;
   a first output side oil passage which connects the first discharge port and the object to be controlled and into which the oil discharged through the first discharge port flows and which supplies the oil pressure to the object to be controlled;
   a second output side oil passage into which the oil discharged through the second discharge port flows;
   a first connection oil passage through which the first output side oil passage and the second output side oil passage are connected;
   a second connection oil passage through which the second output side oil passage and the input side oil passage are connected;

a first valve device provided in the first connection oil passage;

a second valve device provided in the second connection oil passage; and a third connection oil passage in which the second valve device is connected to a portion of the first output side oil passage between a portion to which the first connection connected and the object to be controlled, wherein the first valve device is brought into an open state in which oil in the first connection oil passage is allowed to flow from the second output side oil passage to the first output side oil passage when a first value obtained by subtracting a value of a first output oil pressure in a portion in the first output side oil passage to which the first connection oil passage is connected from a value of a second output oil pressure in a portion in the second output side oil passage to which the first connection oil passage is connected is equal to or larger than a first threshold value greater than 0, and is brought into a closed state in which a flow of the oil in the first connection oil passage between the second output side oil passage and the first output side oil passage is cut off when the first value is smaller than the first threshold value, the second valve device is brought into an open state in which the oil in the second connection oil passage is allowed to flow from the second output side oil passage to the input side oil passage when an oil pressure in the third connection oil passage is equal to or larger than a second threshold value, and is brought into a closed state in which a flow of the oil in the second connection oil passage between the second output side oil passage and the input side oil passage is cut off when the oil pressure in the third connection oil passage is smaller than the second threshold value, and the first value is equal to or larger than the first threshold value and the first valve device is in the open state when the second valve device is in the closed state.

2. The hydraulic control device according to claim 1, further comprising:

a third valve device provided in the third connection oil passage, wherein the third valve device is brought into an open state in which the oil in the third connection oil passage is allowed to flow from the first output side oil passage to the second valve device when a third output oil pressure in a portion in the first output side oil passage to which the third connection oil passage is connected is equal to larger than a third threshold value, and is brought into a closed state in which a flow of the oil in the third connection oil passage between the first output side oil passage and the second valve device is cut off when the third output oil pressure is smaller than the third threshold value.

3. The hydraulic control device according to claim 1, wherein the first valve device includes:

a first spool hole extending in a first direction;

a first spool valve extending in the first direction and disposed inside the first spool hole to be movable in the first direction; and a first elastic member configured to push the first spool valve from one side in the first direction to another side in the first direction, the oil from the first output side oil passage flows into a portion inside the first spool hole positioned on the one side of the first spool valve in the first direction, the oil from the second output side oil passage flows into a portion inside the first spool hole positioned on the another side of the first spool valve in the first direction, and the first spool valve has a first connection oil passage through which the oil flowing from the second output side oil passage to the first output side oil passage passes.

4. The hydraulic control device according to claim 3, further comprising:

a first branch oil passage through which a portion of the first connection oil passage through which the first output side oil passage and the first valve device are connected and a portion inside the first spool hole positioned on the one side of the first spool valve in the first direction are connected, wherein the oil from the first output side oil passage flows into the portion inside the first spool hole positioned on the one side of the first spool valve in the first direction via the first branch oil passage.

5. The hydraulic control device according to claim 1, further comprising:

a supply oil passage connected to the third connection oil passage and configured to supply the oil to a portion of the object to be controlled as lubricating oil.

6. The hydraulic control device according to claim 1, further comprising:

a fourth connection oil passage through which the third connection oil passage and the input side oil passage are connected; and a fourth valve device provided in the fourth connection oil passage, wherein the fourth valve device is brought into an open state in which the oil in the fourth connection oil passage is allowed to flow from the third connection oil passage to the input side oil passage when the oil pressure in the third connection oil passage is equal to larger than a fourth threshold value, and is brought into a closed state in which a flow of the oil in the fourth connection oil passage between the third connection oil passage and the input side oil passage is cut off when the oil pressure in the third connection oil passage is smaller than the fourth threshold value.

7. The hydraulic control device according to claim 1, wherein an oil pressure of the oil discharged through the second discharge port is larger than an oil pressure of the oil discharged through the first discharge port.

8. The hydraulic control device according to claim 1, wherein the second valve device includes:

a second spool hole extending in a second direction;

a second spool valve extending in the second direction and disposed inside the second spool hole to be movable in the second direction; and a second elastic member configured to apply an elastic force to the second spool valve from one side in the second direction to another side in the second direction, wherein the oil from the third connection oil passage flows into a portion inside the second spool hole positioned on the another side of the second spool valve in the second direction, and the second spool valve has a second connection oil passage through which the oil flowing from the second output side oil passage to the input side oil passage passes.

* * * * *